Dec. 25, 1923.  1,478,887
P. BUTCHER
PISTON
Filed April 6, 1922    2 Sheets-Sheet 1
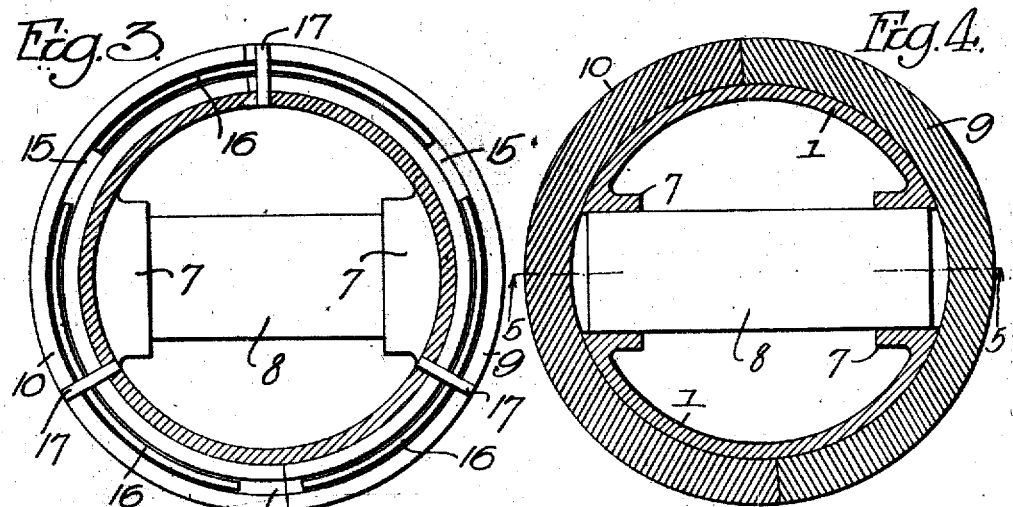
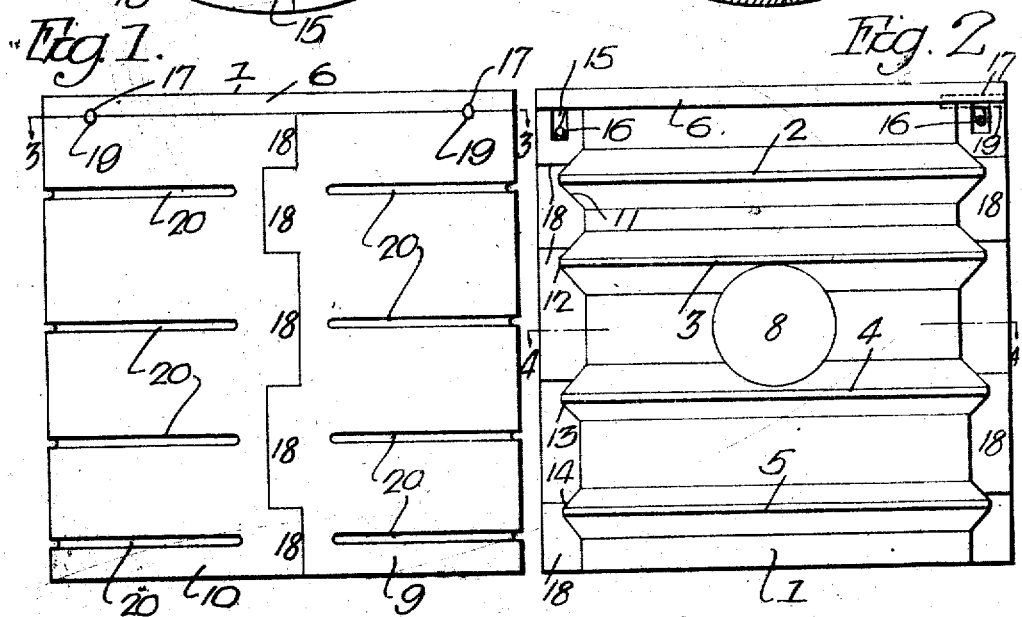
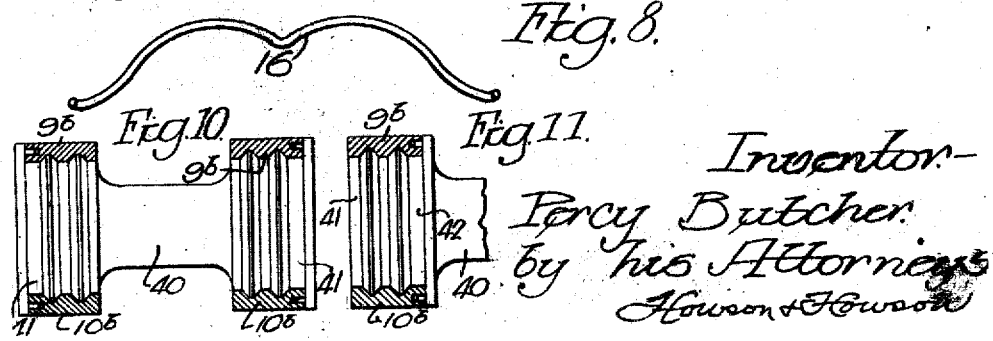
Inventor—
Percy Butcher.
by his Attorneys
Howson & Howson Dec. 25, 1923.  
P. BUTCHER  
PISTON  
Filed April 6, 1922
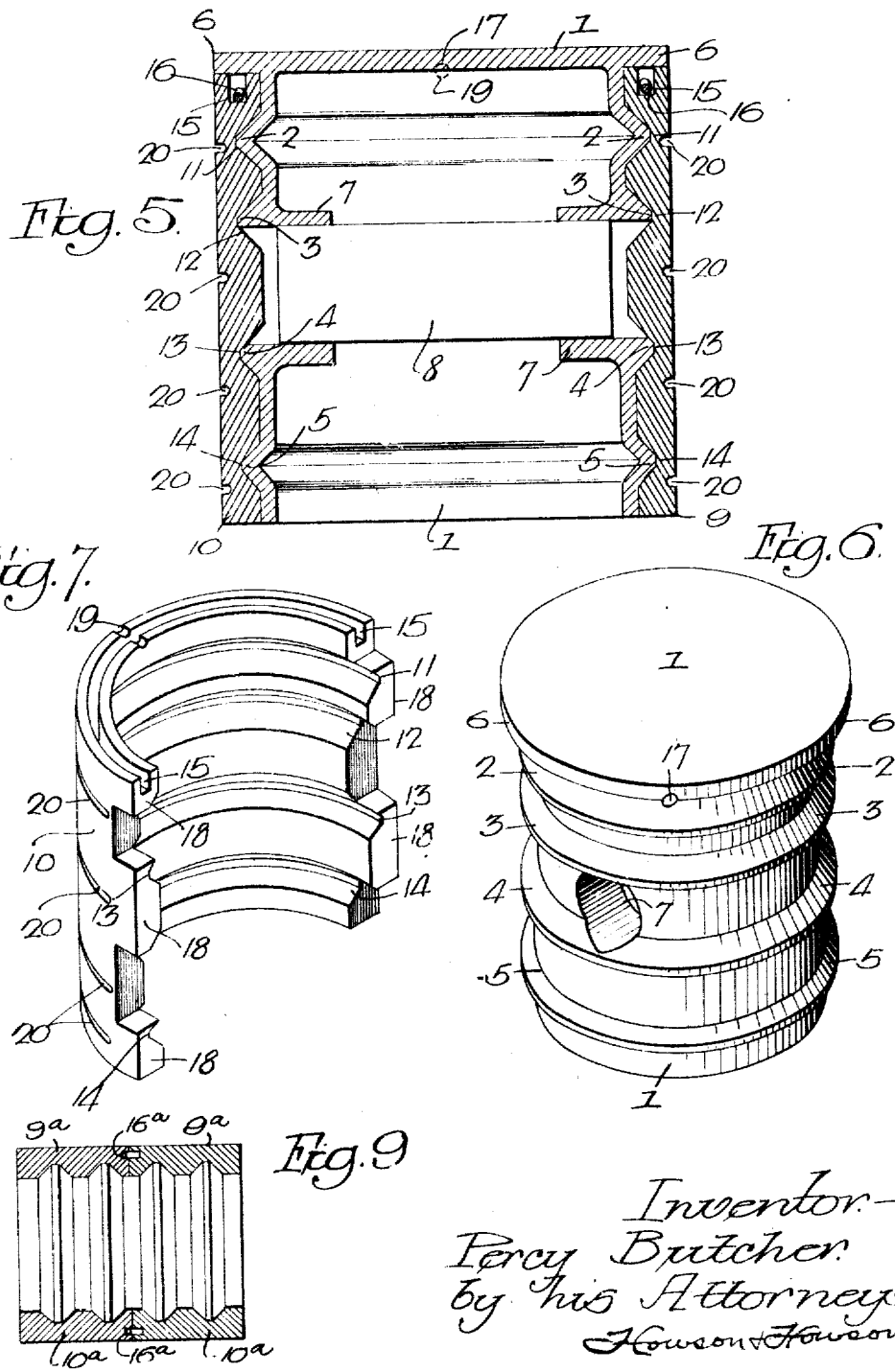

Patented Dec. 25, 1923.

1,478,887

UNITED STATES PATENT OFFICE.

PERCY BUTCHER, OF JACKSONVILLE, FLORIDA.

PISTON.

Application filed April 6, 1922. Serial No. 550,077.

*To all whom it may concern:*

Be it known that I, PERCY BUTCHER, a subject of the King of Great Britain, having declared my intention of becoming a citizen of the United States, residing in Jacksonville, Florida, have invented Pistons, of which the following is a specification.

One object of my invention is to provide a novel form of piston or piston valve including a body and an expanding shell therefor particularly designed to prevent leakage of gases or other fluid both between the shell and the walls of the cylinder in which the piston operates as well as between the shell and the body, and the invention contemplates more especially novel coacting structures on the body and shell arranged and constructed to attain this end.

Another object of my invention is to provide a piston body of novel form especially designed to coact with the parts of an expanding shell in such manner as to effectually prevent leakage of fluid longitudinally of the piston; the invention including also a novel member and mounting therefor arranged to maintain the parts of the piston body and shell in sealing or fluid-tight engagement.

A further object of my invention is to so form a piston body and parts of an expanding shell that when combined with a suitably positioned spring means, they will engage each other in such manner as to effectually prevent leakage longitudinally of the piston either between the parts of the shell and the adjacent cylinder walls or between the shell and the body, the invention contemplating further a novel arrangement of labyrinthine joints between the parts of the expanding shell.

I also desire to provide a multiple sealing construction between a piston body and an expansible shell therefor which in addition to being highly efficient, shall be inexpensive to make, simple and durable in construction and possessed of a minimum number of parts.

These objects and other advantageous ends I attain as hereinafter set forth, reference being had to the accompanying drawings, in which, Fig. 1 is a side elevation of a piston constructed according to my invention, Fig. 2 is a side elevation of the piston body with one of the sections of the expansible shell removed and the spring element in section;

Fig. 3 is a horizontal section on the line 3—3, Fig. 1;

Fig. 4 is a horizontal section on the line 4—4, Fig. 2;

Fig. 5 is a vertical section on the line 5—5, Fig. 4;

Fig. 6 is a perspective view of the piston body;

Fig. 7 is a perspective view of one of the sections of the shell;

Fig. 8 is a perspective view of one of the spring elements;

Fig. 9 is an elevation, partly in section, illustrating a modified form of my invention; and Figs. 10 and 11 are elevations, partly in longitudinal section, illustrating my invention as applied to two forms of piston valves.

In the above drawings 1 represents the body of my piston, which while being substantially cylindrical in outline, has a series of annular ribs 2, 3, 4 and 5 extending around it, although without departing from my invention a greater or less number of ribs may be employed. The latter are essentially provided with or made to include conical bearing faces and in the case illustrated, the top or closed end of the piston is formed with an outwardly extending flange 6, being hollow and provided with inwardly projecting bosses 7 for the reception of a wrist pin 8.

Mounted on the piston body 1 is an expanding shell made in a plurality of parts (in the present instance two), indicated at 9 and 10, which while having cylindrically curved external surfaces, are internally formed with semi-annular grooves 11, 12, 13 and 14 designed to respectively receive and fit the ribs 2, 3, 4 and 5 of the body. The shell sections 9 and 10 when applied to the piston body, define a cylindrical structure whose diameter is equal to or slightly greater than that of the flanged end 6 of said body and their opposed edges are preferably formed with alternate notches and projections so that they fit one into the other to provide labyrinthine joints extending longitudinally of the piston body.

It is particularly to be noted that as shown in Figs. 5 and 7, for example, those portions of each of the joints which lie in planes transverse to the longitudinal axis of the piston, intersect the inclined surfaces of the grooves 11, 12, 13 and 14, so that their inner edges bear upon the inclined surfaces of the ribs 2, 3, 4 and 5 of the piston body.

The top edge of each of the shell sections 9 and 10 is recessed concentrically with the piston body, as indicated at 15, for the reception of suitably formed spring elements 16 formed and arranged to act against the flange 6 of the piston body so as to force the sections of the shell away from the same into contact with the inclined surfaces of the ribs 2, 3, 4 and 5 of the piston body.

As a result of this construction, when a piston made as above described is mounted in an engine or pump cylinder of suitable dimensions, the spring elements 16 coact with the upper inclined face of each of the ribs of the piston body to force the sections of the shell outwardly so as to maintain them at all times in contact with the cylinder walls. At the same time this pressure of the inclined surfaces of the grooves and shell sections against the similarly inclined surfaces of the ribs, insures fluid tight joints at a plurality of points between the shells and the piston body. Leakage of fluid from one end of the piston to the other through the joints between the longitudinal edges of the sections 9 and 10 is effectually prevented because of the described arrangement of the parts of said joints whereby the edges of the projections 18 forming part of them, are in sealing engagement with the inclined surfaces of the ribs on the piston body.

In order to prevent rotation of the shell sections upon the piston body, I provide this with radially projecting dowel pins 17 adjacent the flange 6 and form grooves or recesses 19 for said pins in the adjacent edge of said expanding shell sections. To insure proper lubrication between the surface of the shell sections and the cylinder walls, I provide in the outer surface of said sections any number of grooves 20 which serve to collect and distribute lubricant under operating conditions. It will be noted that if fluid under pressure be applied to the piston from the bottom instead of from the top, it will act upon the lower end or edge of the shell sections in a manner similar to the spring elements 16, forcing said sections toward the flange 6 so that the lower inclined surfaces of their grooves 11—14 make sealing engagement with the under sides of the ribs 2—5, at the same time that the sections expand or move slightly apart so that their cylindrical surfaces make fluid tight engagement with the cylinder walls.

With the above described arrangement of parts leakage past the piston in either direction is effectually prevented as well as leakage between the body and expanding shell, or through the joints between the adjacent edges of the shell sections.

If desired I may omit the flange 6 at the end of the piston and form the expanding shell in two pairs of coacting sections, as illustrated in Fig. 9. In this case each pair of sections 9ª and 10ª form an annular structure surrounding the piston body and between the adjacent edges of these structures are mounted springs 16ª tending to force them apart into coaction with the inclined faces of the ribs in the manner characterizing the action of the springs 16 previously described.

Obviously it is immaterial just what type of prime mover or motor utilizes the above described features of my invention, since pistons or plungers constructed as above described may be employed advantageously in steam engines of the double or single acting type as well as in uniflow engines, pumps, etc. Moreover, without departing from my invention, I may use the construction described in connection with piston valves, in either of the ways suggested in Figs. 10 and 11. In the first case the piston valve is designed for use in a chest or casing in which fluid under pressure is admitted to the head ends of the valve which includes a body 40 and cylindrical heads 41. The latter are equipped with outwardly projecting flanges 42 at their outer edges and are provided with angular ribs for coaction with the parts of a correspondingly formed expanding shell 9ᵇ and 10ᵇ. These are preferably acted on by springs and are constructed and function in the same manner as previously described in connection with the other forms of my invention.

If the piston valve, as in the case of Fig. 11, is designed for inside admission, flanges 42ᵇ are provided on each of the heads 41 adjacent its body 40 and the expanding shells with their coacting springs are constructed and arranged as previously described.

I claim:

1. The combination in a piston of a body having a plurality of conical surfaces thereon; with an expanding shell mounted on said body made up of a plurality of independent segmental sections and including inclined surfaces coacting with the conical surfaces of the body to form fluid-tight joints therewith.

2. The combination in a piston of a body having at least one annular rib thereon formed with a conical bearing surface; with a shell made in a plurality of segmental parts formed to cooperate with the rib; and means tending to move the shell sections longitudinally of the body.

3. The combination in a piston of a body having a plurality of annular ribs each formed with two conical surfaces; a shell made in a plurality of sections and having grooves formed to fit said ribs, the adjacent edges of said sections being formed with projections coacting to form labyrinthine joints.

4. The combination in a piston of a body having a plurality of annular ribs each formed with two conical surfaces; a shell made in a plurality of sections and having grooves formed to fit said ribs, the adjacent edges of said sections being formed with projections coacting to form labyrinthine joints intersecting the inclined surfaces of the grooves in planes at right angles to the center line of the piston.

5. The combination in a piston of a body having a flange and formed with at least one annular rib having inclined sides; a shell mounted on said body to cooperate with said rib and made in a plurality of sections having labyrinthine joints between their adjacent edges; with spring means mounted between the flange of the body and the adjacent portions of the shell sections.

6. The combination in a piston of a body having a flange at its closed end and formed with a plurality of angular encircling ribs; a shell made in a plurality of sections having grooves formed to fit said ribs and having their portions adjacent the flange recessed; with spring means in the recess tending to move the shell sections longitudinally of the piston.

PERCY BUTCHER.